United States Patent
Mukherjee et al.

(10) Patent No.: US 11,841,220 B2
(45) Date of Patent: Dec. 12, 2023

(54) SYSTEM AND METHOD FOR SUB-WAVELENGTH DETECTION FOR JETTING-BASED ADDITIVE MANUFACTURING USING A SPLIT RING RESONATOR PROBE

(71) Applicant: Lawrence Livermore National Security, LLC, Livermore, CA (US)

(72) Inventors: Saptarshi Mukherjee, Milpitas, CA (US); Tammy Chang, San Ramon, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 36 days.

(21) Appl. No.: 17/455,549

(22) Filed: Nov. 18, 2021

(65) Prior Publication Data

US 2023/0152090 A1 May 18, 2023

(51) Int. Cl.
| | |
|---|---|
| *G01R 27/04* | (2006.01) |
| *G01R 27/32* | (2006.01) |
| *G01B 21/12* | (2006.01) |
| *G01B 15/00* | (2006.01) |
| *G01N 22/00* | (2006.01) |
| *B33Y 40/00* | (2020.01) |

(Continued)

(52) U.S. Cl.
CPC .............. *G01B 21/12* (2013.01); *B33Y 40/00* (2014.12); *G01B 15/00* (2013.01); *G01N 22/00* (2013.01); *G01N 22/02* (2013.01); *G01N 22/04* (2013.01); *G01F 1/74* (2013.01); *G01F 23/284* (2013.01)

(58) Field of Classification Search
CPC ........ G01B 21/12; G01B 15/00; B33Y 40/00; G01N 22/00; G01N 22/04; G01N 22/02; G01F 23/284; G01F 1/74; G01F 23/2845
USPC ........... 324/76.11–76.83, 459, 600, 629, 637
See application file for complete search history.

(56) References Cited

U.S. PATENT DOCUMENTS

| | | | |
|---|---|---|---|
| 2006/0125465 A1* | 6/2006 | Xiang | .................. G01Q 10/065 324/72.5 |
| 2008/0174306 A1* | 7/2008 | Brady | ................ G01N 27/9046 324/222 |

(Continued)

OTHER PUBLICATIONS

V. A. Beck et al., "A combined numerical and experimental study to elucidate primary breakup dynamics in liquid metal droplet-on-demand printing," Physics of Fluids, vol. 32, No. 11, p. 112020, Nov. 2020.

(Continued)

*Primary Examiner* — Raul J Rios Russo
(74) *Attorney, Agent, or Firm* — HARNESS, DICKEY & PIERCE, P.L.C.

(57) ABSTRACT

The present disclosure relates to a system for detecting and analyzing droplets of feedstock material being ejected from an additive manufacturing device. The system makes use of a split ring resonator (SRR) probe including a ring element having a gap, with the gap being positioned adjacent a path of travel of the droplets of feedstock material. An excitation signal source is used for supplying an excitation signal to the SRR probe. An analyzer analyzes signals generated by the SRR probe in response to perturbations in an electric field generated by the SRR probe as the droplets of feedstock material pass the ring element. The signals are indicative of dimensions of the droplets of feedstock material.

19 Claims, 4 Drawing Sheets

(51) Int. Cl.
*G01N 22/04* (2006.01)
*G01N 22/02* (2006.01)
G01F 23/284 (2006.01)
G01F 1/74 (2006.01)

(56) References Cited

U.S. PATENT DOCUMENTS

| | | | |
|---|---|---|---|
| 2015/0033823 A1* | 2/2015 | Blumberg, Jr. | G01N 22/00 73/19.03 |
| 2016/0033422 A1* | 2/2016 | Vaisman | G01N 22/00 324/633 |
| 2021/0231587 A9* | 7/2021 | Torun | H01Q 1/2208 |

OTHER PUBLICATIONS

Y. Idell, N. Watkins, A. Pascall, J. Jeffries, and K. Blobaum, "Microstructural Characterization of Pure Tin Produced by the Drop-on-Demand Technique of Liquid Metal Jetting," Metall and Mat Trans A, vol. 50, No. 9, pp. 4000-4005, Sep. 2019.

T. Wang, T.-H. Kwok, C. Zhou, and S. Vader, "In-situ droplet inspection and closed-loop control system using machine learning for liquid metal jet printing," Journal of Manufacturing Systems, vol. 47, pp. 83-92, Apr. 2018.

J. Huang, L. J. Segura, T. Wang, G. Zhao, H. Sun, and C. Zhou, "Unsupervised learning for the droplet evolution prediction and process dynamics understanding in inkjet printing," Additive Manufacturing, vol. 35, p. 101197, Oct. 2020.

T. Chang et al., "An in-situ millimeter-wave diagnostic for droplet characterization during jetting-based additive manufacturing processes," in Nondestructive Characterization and Monitoring of Advanced Materials, Aerospace, Civil Infrastructure, and Transportation IX, 2020, vol. 11380, p. 1138008.

T. Chang et al., "In-situ monitoring for liquid metal jetting using a millimeter-wave impedance diagnostic," Scientific Reports, vol. 10, No. 1, p. 22325, Dec. 2020.

D. Isakov, C. J. Stevens, F. Castles, and P. S. Grant, "A Split Ring Resonator Dielectric Probe for Near-Field Dielectric Imaging," Scientific Reports, vol. 7, No. 1, p. 2038, May 2017.

S. Mukherjee, X. Shi, L. Udpa, S. Udpa, Y. Deng, and P. Chahal, "Design of a Split-Ring Resonator Sensor for Near-Field Microwave Imaging," IEEE Sensors Journal, vol. 18, No. 17, pp. 7066-7076, Sep. 2018.

H. Hamzah, J. Lees, and A. Porch, "Split ring resonator with optimised sensitivity for microfluidic sensing," Sensors and Actuators A: Physical, vol. 276, pp. 1-10, Jun. 2018.

E. L. Chuma, Y. Iano, G. Fontgalland, and L. L. B. Roger, "Microwave Sensor for Liquid Dielectric Characterization Based on Metamaterial Complementary Split Ring Resonator," IEEE Sensors Journal, vol. 18, No. 24, pp. 9978-9983, Dec. 2018.

\* cited by examiner

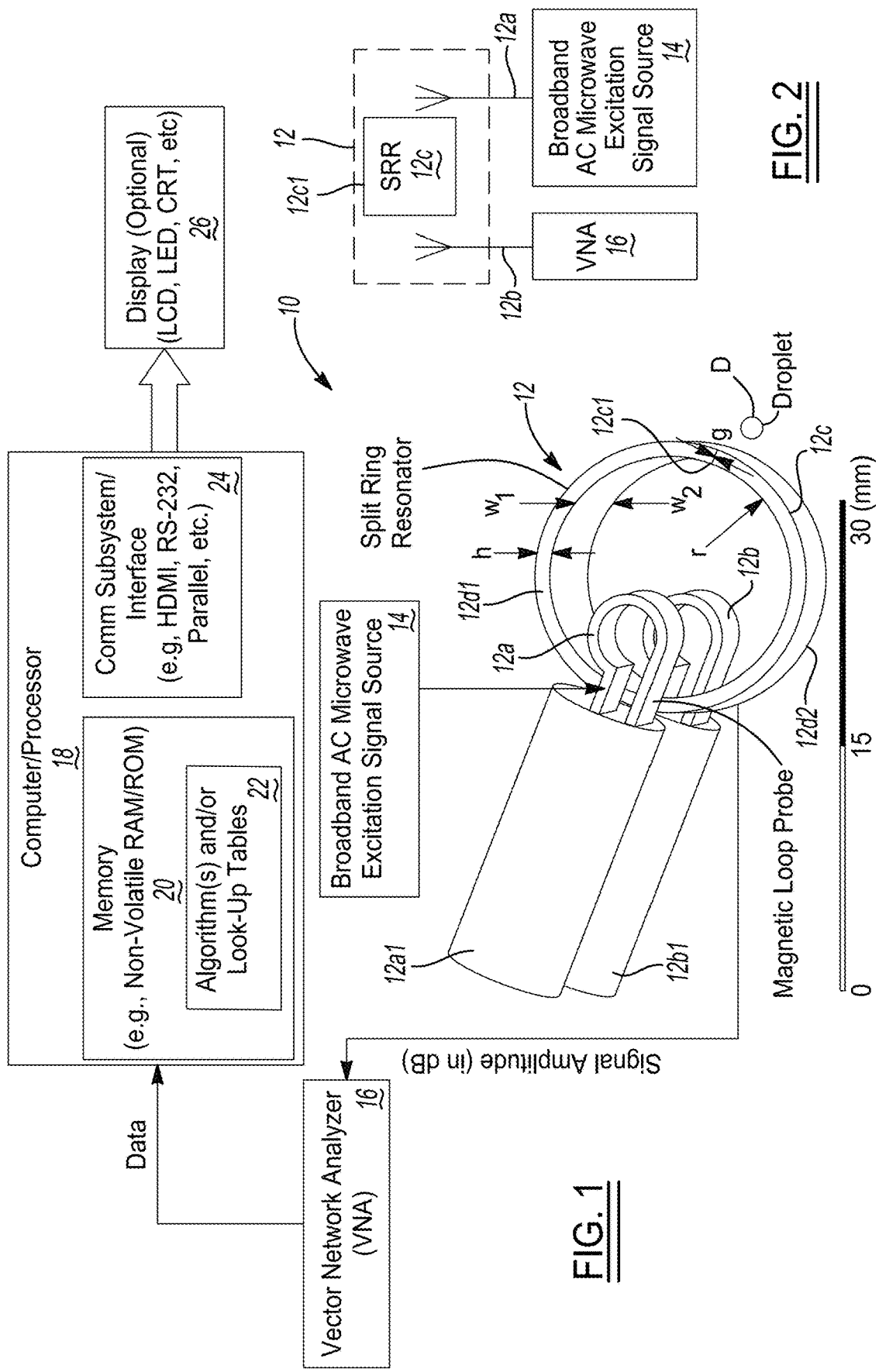

SYSTEM AND METHOD FOR SUB-WAVELENGTH DETECTION FOR JETTING-BASED ADDITIVE MANUFACTURING USING A SPLIT RING RESONATOR PROBE

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to jetting-based additive manufacturing systems, and more particularly to systems and methods for jetting-based additive manufacturing which incorporate an in-situ droplet-on-demand analysis subsystem for detecting and analyzing sub-wavelength discrete droplets.

BACKGROUND

The statements in this section merely provide background information related to the present disclosure and may not constitute prior art.

Jetting-based additive manufacturing is emerging as a competitive technology due to its advantages over other fusion-based additive manufacturing (AM) methods such as powder bed fusion. These advantages include fast build times and minimal post-processing (see, e.g., V. A. Beck et al., "*A combined numerical and experimental study to elucidate primary breakup dynamics in liquid metal droplet-on-demand printing*," Physics of Fluids, vol. 32, no. 11, p. 112020, November 2020; Y. Idell, N. Watkins, A. Pascall, J. Jeffries, and K. Blobaum, "*Microstructural Characterization of Pure Tin Produced by the Drop-on-Demand Technique of Liquid Metal Jetting*," Metall and Mat Trans A, vol. 50, no. 9, pp. 4000-4005, September 2019.

In Droplet-on-Demand (DoD) systems, discrete droplets are produced at the nozzle by inducing a volumetric change in the fluid. Because the droplet ejection process can occur near the extremes of printability, the process requires diagnostics capable of detecting size variation, undesired satellite ejection, and other print irregularities.

Recent efforts in addressing the challenges with analyzing the droplet ejection process have involved applying machine learning to high-speed video diagnostics (see, e.g., T. Wang, T.-H. Kwok, C. Zhou, and S. Vader, "*In-situ droplet inspection and closed-loop control system using machine learning for liquid metal jet printing*," Journal of Manufacturing Systems, vol. 47, pp. 83-92, April 2018; J. Huang, L. J. Segura, T. Wang, G. Zhao, H. Sun, and C. Zhou, "*Unsupervised learning for the droplet evolution prediction and process dynamics understanding in inkjet printing*," Additive Manufacturing, vol. 35, p. 101197, October 2020). However, high-speed video sizes scale up quickly and can produce a major processing bottleneck. As such, recent work by individuals at the assignee of the present disclosure has demonstrated the use of millimeter-wave waveguide-based approaches as an alternative to in-situ diagnostics for real-time monitoring of a custom liquid metal jetting droplet-on-demand system (see, e.g., T. Chang et al., "*An in-situ millimeter-wave diagnostic for droplet characterization during jetting-based additive manufacturing processes*," in Nondestructive Characterization and Monitoring of Advanced Materials, Aerospace, Civil Infrastructure, and Transportation IX, 2020, vol. 11380, p. 1138008; T. Chang et al., "*In-situ monitoring for liquid metal jetting using a millimeter-wave impedance diagnostic*," Scientific Reports, vol. 10, no. 1, p. 22325, December 2020). Droplets ranging from 400 µm to 2 mm have been detected using an open-ended waveguide operated at a continuous-wave frequency of 40 GHz. Additionally, early efforts have shown promise for applying machine learning to train high-speed video and microwave data to predict droplet parameters based on microwave data alone.

Although these efforts address the key challenges of in-situ diagnostics for jetting-based droplet-on-demand ("DoD") systems, a critical challenge for practical deployment remains: namely, the desired droplet size of DoD systems is as small as 50 to 100 µm.

Although 400 µm diameter droplets have been detected at 40 GHz, this size is substantially sub-wavelength ($\sim\lambda/20$), and hence the resulting detected signal is extremely low (0.2 dB variation). To extract information beyond the presence of a droplet, the signal-to-noise ratio must be increased. Furthermore, droplets with diameters up to 8 times smaller than the current system detection limit must be characterized. Although operational frequency can be increased to the lower THz regime ($\sim$200-300 GHz) for droplet detection and characterization at these dimensions, the complexity and cost (>$200 k) of terahertz equipment is unreasonable for practical present day AM systems.

As such, an important need remains for systems and methods which are able to detect and characterize sub-wavelength droplets with jetting-based DOD systems.

SUMMARY

This section provides a general summary of the disclosure, and is not a comprehensive disclosure of its full scope or all of its features.

In one aspect the present disclosure relates to a system for detecting and analyzing droplets of feedstock material being ejected from an additive manufacturing device. The system may comprise a split ring resonator (SRR) probe including a ring element having a gap. The gap is positioned adjacent a path of travel of the droplets of feedstock material. An excitation signal source may be included for supplying an excitation signal to the SRR probe. An analyzer may be included for analyzing signals generated by the SRR probe. The SRR probe generates the signals in response to perturbations in an electric field generated by the SRR probe as the droplets of feedstock material pass the ring element. The signals are indicative of dimensions of the droplets of feedstock material.

In another aspect the present disclosure relates to a system for detecting and analyzing droplets of feedstock material being ejected from a jetting-based additive manufacturing device. The system may comprise a split ring resonator (SRR) probe including a pair of radiators having a ring element disposed therebetween. The ring element has a gap, and the gap is positioned adjacent a path of travel of the droplets of feedstock material such that the droplets travel past and adjacent the gap. A microwave excitation signal source may be included for supplying an excitation signal to the SRR probe. An analyzer may be included for analyzing signals generated by the SRR probe. The SRR probe generates the signals in response to perturbations in an electric field generated by the SRR probe as the droplets of feedstock material pass the ring element. The signals are indicative of a radius of the droplets of feedstock material.

In still another aspect the present disclosure relates to a method for detecting and analyzing droplets of feedstock material being ejected from an additive manufacturing device. The method may comprise positioning a split ring resonator (SRR) probe including a ring element having a gap, such that the gap is positioned adjacent a path of travel of the droplets of feedstock material. The method may further include applying an excitation signal to the SRR probe such that the SRR probe creates an electric field in a vicinity of the gap of the ring element. The method may include detecting perturbations in the electric field caused by the droplets of feedstock material travelling adjacent and past the gap, and generating signals in accordance with the perturbations. The method may further include analyzing the signals to correlate the signals to a dimensional feature of each of the droplets moving past the gap.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 1 is a high level block diagram of one embodiment of a system in accordance with the present disclosure;

FIG. 2 is simplified schematic diagram illustrating an equivalent circuit for the SRR subsystem (without the cylindrical insulator structures), to help illustrate how the SRR probe operates;

DETAILED DESCRIPTION

Figure 3:
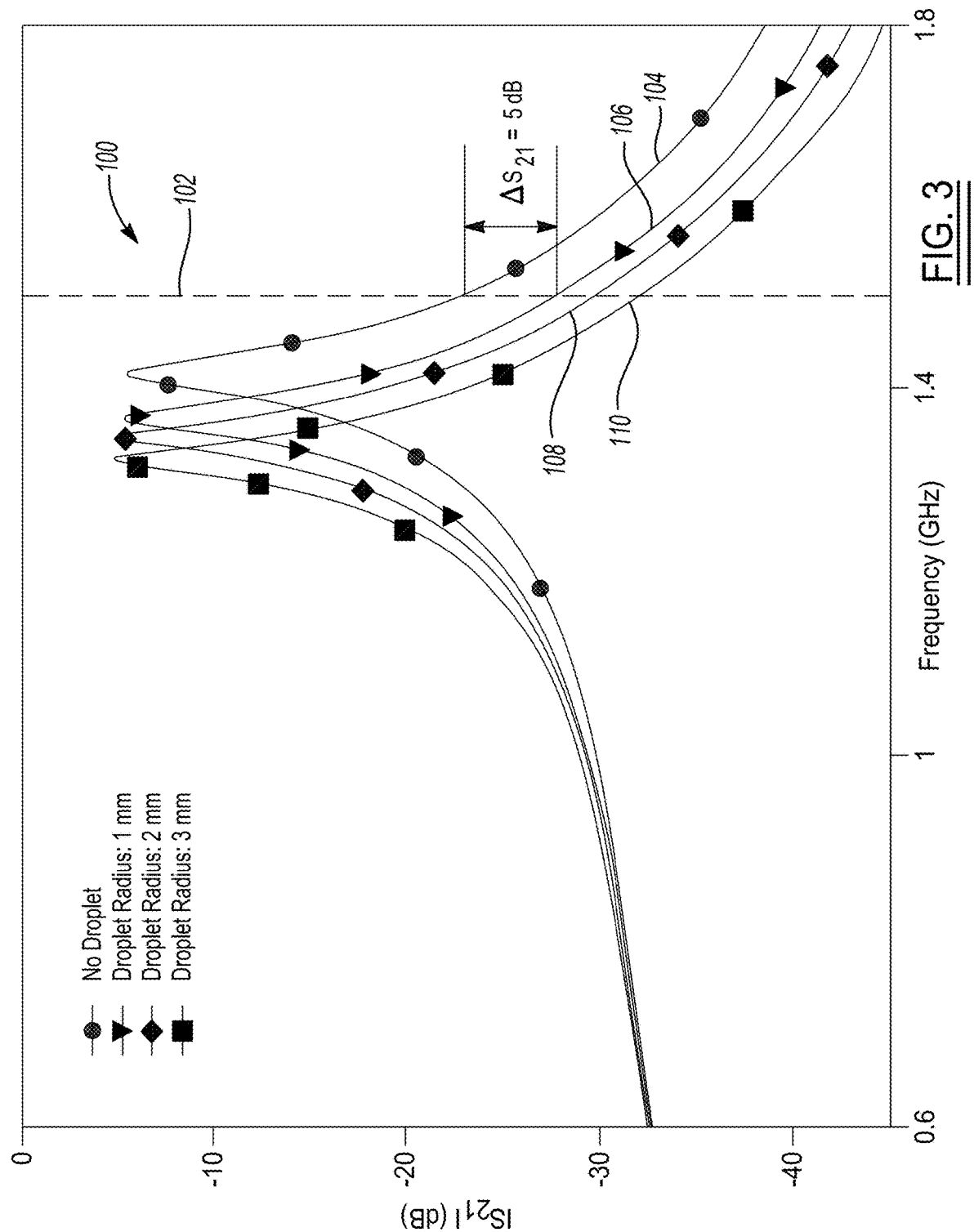
FIG. 3 is a graph illustrating the resulting amplitude drops in the signal sensed by the SRR subsystem for particles of different sizes, using a single excitation frequency of about 1.5 GHz.

Example embodiments will now be described more fully with reference to the accompanying drawings.

The present disclosure involves "droplet-on-demand" ("DOD") jetting-based additive manufacturing systems and methods, and more particularly a system and method which makes use of a split ring resonator approach to detect extremely small droplet sizes, that is droplet sizes typically between 50-100 μm, while simultaneously reducing the required operating frequency to lower microwave frequencies. In this manner equipment costs can be significantly lowered by more than an order of magnitude as a result of not having to use terahertz based diagnostic equipment. The system of the present disclosure makes use of a split ring resonator ("SRR") probe to characterize droplets with diameters on the order of 100 μm, at lower microwave frequencies, and with high sensitivity. The system and the SRR probe enable deployment of a microwave in-situ diagnostic for liquid metal and dielectric droplet-on-demand printing, for which both the diagnostic resolution and required equipment is expected to serve the practical needs of the additive manufacturing community.

Referring to FIG. 1, an in-situ SRR sensing system 10 is shown in accordance with one embodiment of the present disclosure. The system 10 in this example may include a SRR probe 12 having first and second radiators 12a and 12b, respectively, spaced slightly apart from one another (e.g., 5 mm-10 mm from one another), a metallic shielding element 12a1 enclosing a majority of the first radiator 12a, a metallic shielding element enclosing a majority of the second radiator 12b, and a split ring resonator element ("SRR element") 12c having a small gap 12c1 positioned between the first and second radiators 12a and 12b. The gap 12c1 may vary in dimension, but typically may be on the order of 0.1 mm-1 mm in width, and this dimension may be selected in part based on the overall dimensions of the SRR element 12. The radius "r" of the SRR element 12 may be typically between about 7 mm and 12 mm, the width "w" may be between about 1 mm-5 mm, and the height "h" may be between about 0.6 mm-0.9 mm. The spacing between edges W1 and W2 of the SRR element 12 and the radiators 12a and 12b may vary as well, but typically is between about 1 mm-2 mm. Again, all these dimensions may vary significantly depending on a specific application.

The SRR probe 12 receives a broadband AC excitation signal from a broadband AC excitation signal source 14 on its radiating element 12a which is coupled onto the radiating element 12b via the SRR element 12c. This signal will vary in amplitude depending on the diameter of a droplet "D" which is passing closely adjacent to the gap 12c1 of the SRR probe 12 during a printing operation. In this regard it will be appreciated that it is important that the SRR probe 12 be positioned close to the print nozzle that is ejecting the droplets of feedstock material being used to print a structure or object. Preferably the gap 12c1 is located within 1 mm-5 mm of the path of travel of the droplets leaving the print head, and this distance may vary as well depending on variables such the exact type of material that the droplets are comprised of, as well as other variables. The specific frequency of the excitation signal provided by the broadband AC excitation signal source 14 may vary depending on the needs of a specific application, but a microwave signal with a frequency between 1 GHz and 2 GHz is expected to be suitable for most applications.

With further reference to FIG. 1, a suitable signal measurement system or device, for example a vector network analyzer ("VNA") 16, may be used to receive the signal coupled onto the second radiator 12b. In this example the VNA 16 is able to both detect the presence of the droplet D passing by the gap 12c1, as well as a diameter of the droplet D. The VNA 16 is a commercially available component (e.g., available from Keysight Technologies, Inc. of Santa Rosa, CA) and may be in communication with a computer or processor 18 (referred to simply as "computer 18" hereinafter). The VNA 16 may provide data which it has obtained to the computer 18 for further processing. The computer 18 may include a suitable non-volatile memory 20 which includes stored algorithms and/or look-up tables 22 (hereinafter collectively "algorithms/LUTs") which can be used to help convert the data received into easily understand dimensional data (e.g., droplet size in inches or millimeters) in real time. A communication subsystem 24 may optionally be used to communicate with an optional display system 26 for displaying dimensional data relating to the droplet D size, provided that the VNA 16 or the computer 18 does not include a suitable display. The communications subsystem 24 may also enable interfacing to the VNA 16, and may provide one or more distinct interfaces (e.g., HDMI, USB, RS-232, RS-422, parallel, etc.) as may be needed to communicate data between the various components mentioned above.

Referring briefly to FIG. 2, a high level schematic diagram of the SRR probe 12 is shown to help illustrate how the components of the SRR probe operate. The radiators 12a and 12b are conductive (e.g., metal) elements that essentially act as antennas, with the first radiator 12a receiving the broadband AC excitation signal and emitting an electromagnetic wave signal which propagates in part towards the SRR element 12c. The SRR element 12c may likewise be made of an electrically conductive material (e.g., metal, copper, etc.) and couples this electromagnetic wave energy into the second radiator 12b, with the coupling being influenced by how significantly the electric field in the vicinity of the gap 12c1 is perturbed by both the presence of the droplet D as well as its size. The signal electromagnetic wave signal coupled into the second radiator 12b is fed into the VNA 16 for analysis.

A particular advantage of the SRR probe 12 is that is able perform near-field detection of droplets D at extreme sub-wavelength sizes (~λ/100), in situ, and in real time during an additive manufacturing process. The SRR probe 12 forms a resonant electromagnetic structure that is electrically "small" when responding to an oscillating electromagnetic field. By electrically "small" it is meant that its dimensions are much smaller than the wavelength at which it resonates. The presence of a metal droplet D near the ring gap 12c1 produces a field perturbation which leads to a resonance shift, which will serve as the detection mechanism. Based on the perturbation theory for a cavity resonator, the resonant frequency shift (Δf) from its unperturbed resonance frequency ($f_O$) due to the presence of a material of volume V is expressed as:

$$\frac{\Delta f}{fo} = -\frac{\iiint_v \Delta\mu|H_0|^2 + \Delta\varepsilon|E_0|^2}{\iiint_v \mu|H_0|^2 + \varepsilon|E_0|^2},$$

where $E_O$, $H_O$ are the electric and magnetic fields, s and ρ are the original permittivity and permeability and Δs and Δρ are the perturbation in material properties. The SRR probe 12 (FIG. 1a) can thus be optimized to carry out in-situ droplet detection in the near-field region of the SRR element 12c gap 12c1.

Preliminary simulations of an initial SRR probe 12 geometry have demonstrated that this approach can produce signal variation on the order of 5 dB for a metal droplet with a diameter of 2 mm at 1.5 GHz. This is graphically illustrated in the graph 100 of FIG. 3. Dashed line 102 indicates about 1.5 GHz, and curve 104 shows a baseline signal reading when no droplet D is present near the gap 12c1 (in other words a signal produced solely in response to the broadband AC excitation signal). Curves 106 through 110 indicate the perturbation of the electromagnetic signal which is coupled into the second radiator 12b, as a result of the presence of the droplet D near the SRR element 12c gap 12c1. So in this example curve 106 indicates a $\Delta S_{21}$ change from the baseline curve 104 in signal amplitude corresponding to a 5 dB drop, which is produced by a droplet D having a 1 mm radius. Curve 108 indicates a greater drop of about 7 dB, which is produced by a droplet D having a radius of about 2 mm. Curve 110 indicates a drop of about 9 dB, which is produced by a droplet having a radius of about 3 mm. From these results, it is expected that detection of 100-400 μm radius droplets at less than 15 GHz frequencies (FIG. 1b, c) is achievable.

It should also be noted that previous SRR sensor work has focused on static dielectric and composite characterization applications. This differs from the present system and method described herein in which one or more SRR probes 12 may be used to capture dynamic events in real-time. Additionally, the droplet D material being sensed can be metallic or dielectric.

Figure 4:
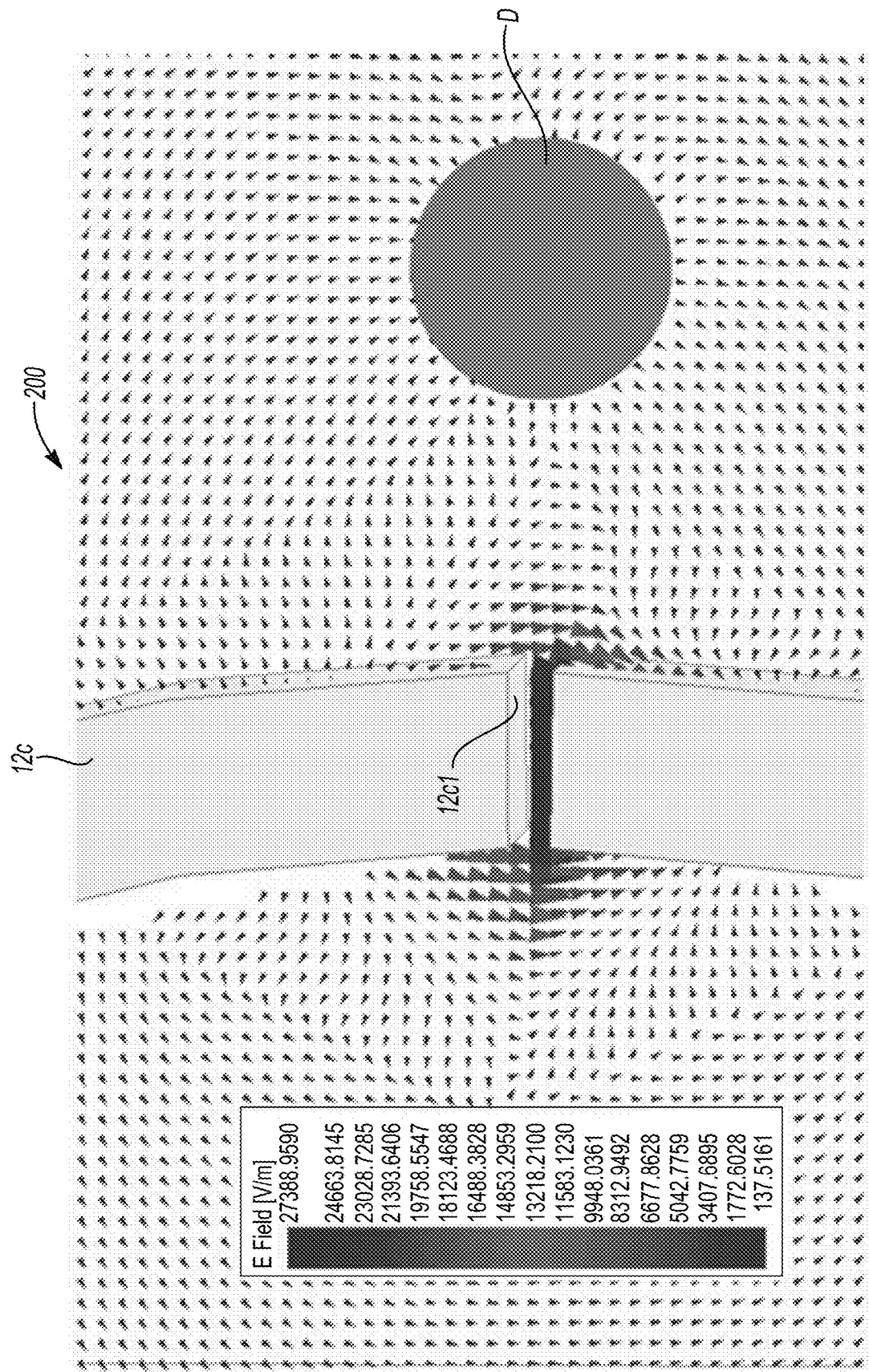
FIG. 4 is a high level simulation of how the electric field around the gap in the SRR element is perturbed by the presence of a metal droplet.

FIG. 4 shows a simulation 200 as to how the electric field strength at the SRR resonant frequency is perturbed in the vicinity of the SRR probe 12 gap 12c as a result of the presence of the droplet D. Although the fields are maximum at the gap 12c1 of the SRR element 12c, significant fringing electric fields flow between the two ends of the gap due to the capacitance at the gap. Scattering of the electric fields by the droplet perturbs the electric field strength that serves as the droplet detection mechanism.

Figures 5, 6:
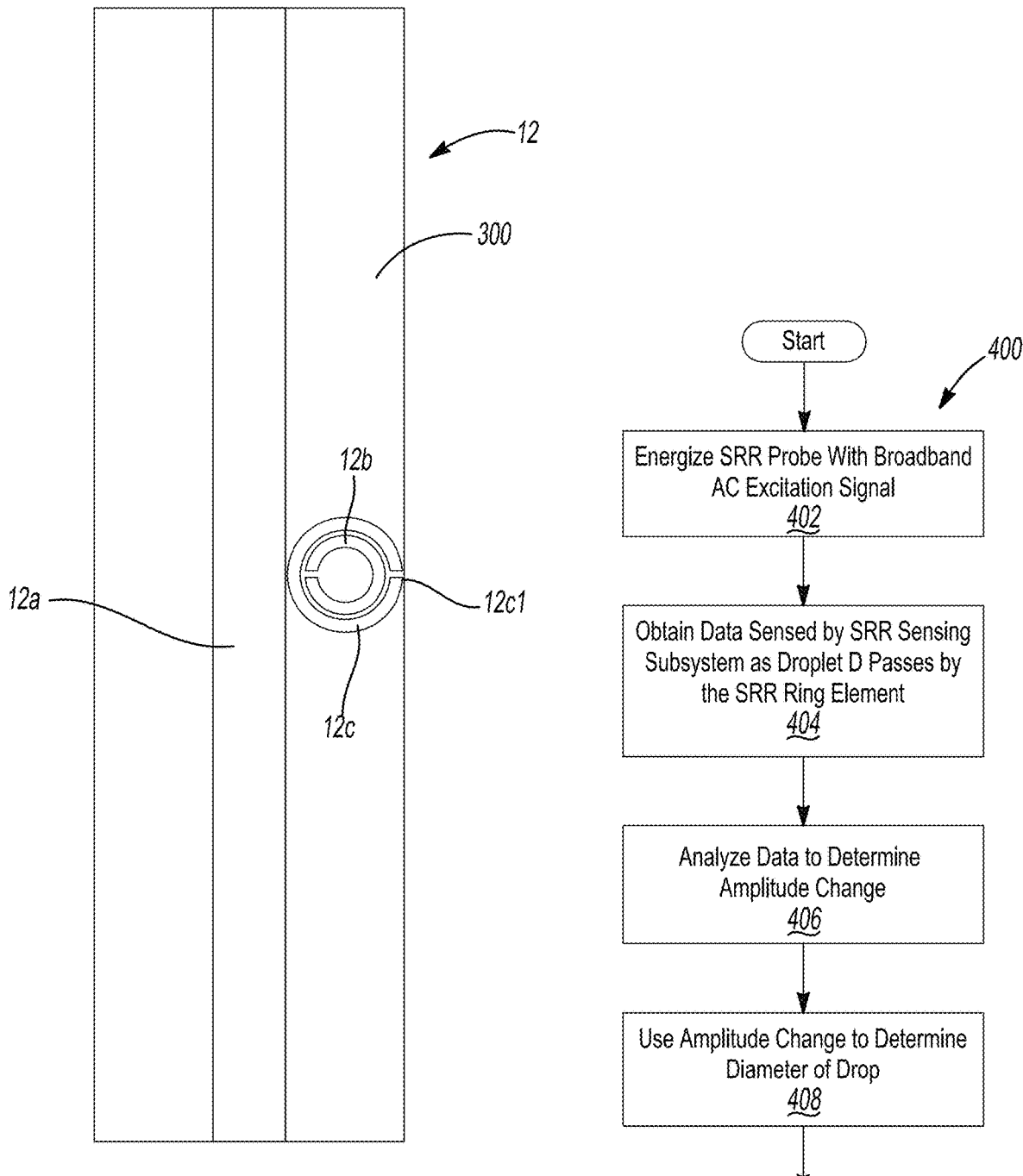
FIG. 5 is one high level plan view of a circuit board showing how the SRR subsystem may be implemented.
FIG. 6 is a flowchart showing one example of high level operations that may be performed by the system of FIG. 1 to sense particle diameter.

FIG. 5 shows a high level example of how the SRR probe 12 can be implemented on a circuit board 300. The radiator 12a is formed as a longitudinal conductive strip. The radiator 12b is formed as a circular element, and the SRR element 12c is formed on the circuit board 300 so that a portion of its material is interposed between the radiators 12a and 12b, with its gap 12c1 positioned at the end of the circuit board 300, and thus able to be in close proximity to the droplet D as the droplet D passes by the gap 12c1. The ability to be implemented in a circuit board configuration enables the SRR probe 12 to be easily used as an in-situ diagnostic probe in additive manufacturing applications, as well as potentially other applications as well. Implementing the probe 12 in a printed circuit board configuration can reduce the required volume of the overall SRR probe 12. Second, the SRR probe 12 can be designed using concentric rings, as shown in 5, or even stacked in different board layers to vary probe properties, for example to achieve high sensitivity within different frequency bands.

FIG. 6 shows a flowchart 400 which sets forth one example of high level operations that may be performed by the system 10 in detecting the presence and dimension of the droplet D. At operation 402 the SRR probe 12 may be energized with microwave energy from the broadband AC excitation signal source 14. At operation 404 data is obtained during those periods in between the presence of droplets D, as well as when droplets D are passing by the gab 12c1. At operation 406 the obtained data is analyzed by the VNA 16 to determine the presence and magnitude of an amplitude change in the received data. At operation 408 when an amplitude change is detected, the magnitude of the change is used to determine the diameter of the droplet D that has passed by the gap 12c1 of the SRR probe 12. In this manner a real time stream of data is collected by the VNA 16 which indicates not only the frequency of droplets D that are passing by the gap 12c1, but the radius of each one of the droplets D as well. As such, changes in the radius of the droplets D can be detected in real time. If the dimension of the droplets D should fall outside a predetermined desirable range, this affords the system operator the opportunity to make needed adjustments to the printing system, possibly in real time, to bring the droplet size back within the desired dimension range.

While the system 10 has been described as being used with an AC excitation signal source of specific frequency, it will be appreciated that in some implementations it may be advantageous to use two or more frequencies. For example, in some applications the use of two or more difference AC frequencies may enable the capability to detect droplets at larger distances away from the SRR element 12c at a lower frequency, and smaller droplets at a higher frequency.

The present system and method thus forms a means for in-situ monitoring and detecting of droplet presence and dimensions, in real time, and providing real time data to a user regarding droplet dimensions. While the system 10 and method described herein are especially well suited to jetting-based additive manufacturing systems, it will be appreciated that the teachings presented herein may readily be extended to virtually any application where in-situ detection of the presence of metal or dielectric particles, as well as the size of such particles, is needed. As such, the various embodiments described herein should not be interpreted to being limited to only jetting-based additive manufacturing applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for detecting and analyzing droplets of feedstock material being ejected from an additive manufacturing device, the system comprising:
    a split ring resonator (SRR) probe including a ring element having a gap, the gap being positioned adjacent a path of travel of the droplets of feedstock material;
    an excitation signal source for supplying an excitation signal to the SRR probe;
    an analyzer for analyzing output signals generated by the SRR probe; and
    the SRR probe generating the output signals in response to perturbations in an electric field generated by the SRR probe as the droplets of feedstock material pass the ring element, and the output signals being indicative of dimensions of the droplets of feedstock material.

2. The system of claim 1, wherein the excitation signal source comprises a broadband AC microwave excitation signal source.

3. The system of claim 2, wherein the broadband AC microwave excitation source provides an AC excitation signal having a frequency between 1 GHz and 2 GHz.

4. The system of claim 1, wherein the analyzer comprises a vector network analyzer.

5. The system of claim 1, wherein the SRR probe further comprises a pair of spaced apart radiators, with the ring element disposed between the pair of radiators; and wherein a first one of the pair of radiators receives the excitation signal, and a second one of the pair of radiators generates the output signals output to the analyzer.

6. The system of claim 1, further comprising a computer responsive to an output of the analyzer and configured to help determine the dimensions of the droplets.

7. The system of claim 6, further comprising a memory operably associated with the computer, the memory including at least one of an algorithm or a look-up table for helping to correlate the output signals generated by the SRR probe with the dimensions of the droplets.

8. The system of claim 7, wherein the dimensions of the droplets represent a radius of each of the droplets detected by the SRR probe.

9. A system for detecting and analyzing droplets of feedstock material being ejected from a jetting-based additive manufacturing device, the system comprising:
 a split ring resonator (SRR) probe including a pair of radiators having a ring element disposed therebetween, the ring element having a gap, the gap being positioned adjacent a path of travel of the droplets of feedstock material such that the droplets travel past and adjacent the gap;
 a microwave excitation signal source for supplying an excitation signal to the SRR probe;
 an analyzer for analyzing output signals generated by the SRR probe; and
 the SRR probe generating the output signals in response to perturbations in an electric field generated by the SRR probe as the droplets of feedstock material pass the ring element, and the output signals being indicative of a radius of the droplets of feedstock material.

10. The system of claim 9, wherein the output signals are also indicative of a frequency at which the droplets pass by the ring element.

11. The system of claim 9, wherein the microwave excitation signal comprises a signal of between 1 GHz and 2 GHz.

12. The system of claim 9, wherein the analyzer comprises a vector network analyzer.

13. The system of claim 9, wherein the SRR probe comprises a first shielding element substantially circumscribing a first one of pair of radiators, and a second shielding element substantially circumscribing a second one of the pair of radiators.

14. The system of claim 9, further comprising a computer responsive to an output of the analyzer for assisting in determining the radius of each of the droplets moving past the gap of the ring element.

15. The system of claim 14, further comprising a display for displaying information pertaining to the radius of each of the droplets.

16. The system of claim 14, further comprising a memory including at least one of an algorithm or a look-up table for assisting in determining the radius of each of the droplets moving past the gap of the ring element.

17. A method for detecting and analyzing droplets of feedstock material being ejected from an additive manufacturing device, the method comprising:
 positioning a split ring resonator (SRR) probe including a ring element having a gap, such that the gap is positioned adjacent a path of travel of the droplets of feedstock material;
 applying an excitation signal to the SRR probe such that the SRR probe creates an electric field in a vicinity of the gap of the ring element;
 detecting perturbations in the electric field caused by the droplets of feedstock material travelling adjacent and past the gap, and generating signals in accordance with the perturbations; and
 analyzing the signals to correlate the signals to a dimensional feature of each of the droplets moving past the gap.

18. The method of claim 17, wherein said applying an excitation signal comprises applying a broadband AC excitation signal having at a microwave frequency.

19. The method of claim 17, wherein said analyzing the signals to correlate the signals to a dimensional feature comprises analyzing the signals to determine at least one of or a radius or a distinct shape of each of the droplets.

* * * * *